UNITED STATES PATENT OFFICE.

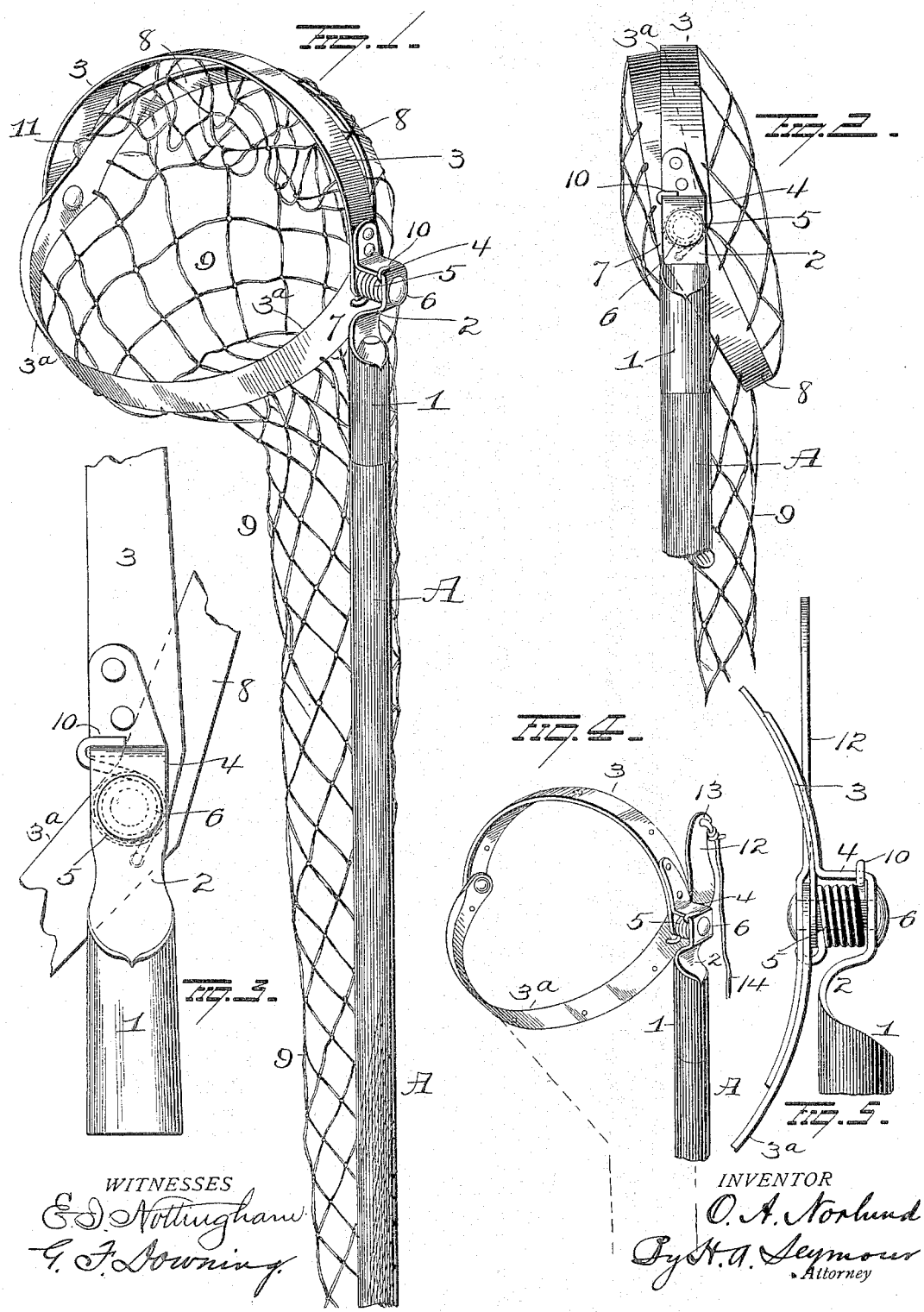

OLOF A. NORLUND, OF CEDAR RUN, PENNSYLVANIA, ASSIGNOR OF ONE-HALF TO GEORGE A. GAMBLE, OF SAME PLACE.

FRUIT-GATHERER.

SPECIFICATION forming part of Letters Patent No. 640,485, dated January 2, 1900.

Application filed October 5, 1899. Serial No. 732,709. (No model.)

*To all whom it may concern:*

Be it known that I, OLOF A. NORLUND, a resident of Cedar Run, in the county of Lycoming and State of Pennsylvania, have invented certain new and useful Improvements in Fruit-Gatherers; and I do hereby declare the following to be a full, clear, and exact description of the invention, such as will enable others skilled in the art to which it appertains to make and use the same.

My invention relates to an improvement in fruit-gatherers, the object of the invention being to provide a fruit-gatherer with improved cutting-jaws which will be maintained normally apart and which can be readily operated to bring the jaws together and cut the stems of the fruit and permit the fruit to fall into the gatherer.

With this object in view the invention consists in certain novel features of construction and combinations and arrangements of parts, as will be more fully hereinafter described, and pointed out in the claims.

In the accompanying drawings, Figure 1 is a perspective view showing the jaws open. Fig. 2 is a similar view showing the jaws closed. Fig. 3 is an enlarged detail view illustrating the spring pivotal point of the jaws, and Figs. 4 and 5 are views of a modified form of my invention.

A represents a post or handle, preferably of wood, on the upper end of which is mounted a metal sleeve 1, provided with an upwardly-projecting arm 2, secured to a semicircular jaw 3 by means of suitable rivets. The arm 2 is bent between its ends to form a housing 4 to inclose a coiled spring 5, mounted on a pivot-pin 6, passing, respectively, through the arm 2, jaw 3, and through a ring 7, one side of which is sharpened and forms a jaw $3^a$ to coöperate with the jaw 3 to cut the fruit-stems, and the other portion of said ring forms a bail 8 for operating the jaws, as will now be explained. The ring 7 is pivoted between its ends to the other end of the jaw 3, as shown.

A flexible sleeve 9 is secured at its upper end to the jaws 3 and $3^a$ and connected between its ends to the bail 8, so that when the jaws are in their open position, as clearly shown in Fig. 1, the sleeve 9 will be taut against the bail 8 and loose between the bail 8 and jaw 3 and against the jaw $3^a$, so that a downward pull on the sleeve 9 will pull the bail 8 down, and hence force the jaw $3^a$ up into contact with the jaw 3 and sever the stems of the fruit and compel the fruit to fall into the sleeve, and when the sleeve is released the bail 8 will spring up and the parts assume their normal positions due to the spring 5, one end of which is passed through a hole in jaw $3^a$ and the other end bent to form a hook 10, which engages one edge of the arm 2, forming the housing for the spring, as clearly shown. A suitable lug or projection 11 is provided on jaw 3 to form a stop, against which the jaw $3^a$ strikes to limit its movement.

Instead of constructing my improved gatherer as above described I might make the same as shown in Figs. 4 and 5. In this form of my invention instead of providing the jaw $3^a$ with the bail 8 an outwardly-projecting arm 12 is secured to one end of the jaw $3^a$ and is provided with a hole 13 in its outer end for the reception of a cord 14 for operating the jaw. In this form of my invention the flexible sleeve will be secured to the jaws, so that when the jaws are forced together the fruit will be inclosed in the sleeve.

It will be seen that in both forms of my invention the spring 5 is inclosed in the housing 4, which will effectually prevent the spring from becoming clogged by fragments of leaves and twigs, which would be the case were the spring not so protected.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a fruit-gatherer, the combination with two jaws pivotally connected together and a net secured to the respective jaws, of an arm having its upper end bent to form a housing, said housing having an extension secured to one of said jaws, and a spring disposed within said housing and having one end attached to the other jaw, the other end of said spring connected with said housing.

2. In a fruit-gatherer, the combination with a pole, a semicircular bail and a ring pivotally attached at diametrically opposite points to the ends of said bail, of a tubular arm provided at its upper end with an extension bent to form a housing, said housing fixed to said bail and a spring disposed within said housing and having its ends secured respectively to the housing and said ring.

In testimony whereof I have signed this specification in the presence of two subscribing witnesses.

OLOF A. NORLUND.

Witnesses:
   CORA HILBORN,
   CORA STALCUP.